United States Patent
Bette

(10) Patent No.: US 12,476,720 B2
(45) Date of Patent: Nov. 18, 2025

(54) METHOD AND MEASUREMENT SYSTEM FOR CHARACTERIZING A RECONFIGURABLE INTELLIGENT SURFACE

(71) Applicant: Rohde & Schwarz GmbH & Co. KG, Munich (DE)

(72) Inventor: Fabian Bette, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 301 days.

(21) Appl. No.: 18/453,633

(22) Filed: Aug. 22, 2023

(65) Prior Publication Data

US 2025/0070892 A1 Feb. 27, 2025

(51) Int. Cl.
*H04B 17/10* (2015.01)
*H04B 7/04* (2017.01)
*H04B 17/20* (2015.01)

(52) U.S. Cl.
CPC ....... *H04B 17/103* (2015.01); *H04B 7/04013* (2023.05); *H04B 17/253* (2023.05)

(58) Field of Classification Search
CPC .................................................. H04B 17/103
See application file for complete search history.

(56) References Cited

U.S. PATENT DOCUMENTS

| | | | |
|---|---|---|---|
| 6,437,748 B1* | 8/2002 | Burnside | G01R 29/105 343/703 |
| 2022/0247480 A1* | 8/2022 | Papadopoulos | G01S 5/0273 |
| 2024/0107485 A1* | 3/2024 | Duan | H04B 7/155 |

FOREIGN PATENT DOCUMENTS

CN 115378515 A 11/2022

OTHER PUBLICATIONS

Garcia, J. C. B et al., "Reconfigurable Intelligent Surfaces: Bridging the gap between scattering and reflection," IEEE, Dec. 10, 2019, 9 pages.
Liu, Y. et al., "Reconfigurable Intelligent Surfaces: Principles and Opportunities," IEEE, May 4, 2021, 73 pages.
Huang, J. et al., "Reconfigurable Intelligent Surfaces: Channel Characterization and Modeling," IEEE, Jun. 6, 2022, 21 pages.

* cited by examiner

*Primary Examiner* — Hsinchun Liao
(74) *Attorney, Agent, or Firm* — CHRISTENSEN O'CONNOR JOHNSON KINDNESS PLLC

(57) ABSTRACT

The present disclosure generally relates to a method and a measurement system for characterizing a reconfigurable intelligent surface of a device under test. An incident signal is repeatedly transmitted onto the reconfigurable intelligent surface at an incident angle with respect to the reconfigurable intelligent surface by using a feed antenna. Reflected signals reflected by the reconfigurable intelligent surface are captured by using at least one probe antenna. The reflected signals are captured at different angles of reflection such that a three-dimensional reflection pattern is obtained. A reflected total radiated power for the reconfigurable intelligent surface is determined based on the three-dimensional reflection pattern by using a determination circuit.

20 Claims, 2 Drawing Sheets

METHOD AND MEASUREMENT SYSTEM FOR CHARACTERIZING A RECONFIGURABLE INTELLIGENT SURFACE

FIELD OF THE DISCLOSURE

The present disclosure generally relates to a method and a measurement system for characterizing a reconfigurable intelligent surface of a device under test.

BACKGROUND

Reconfigurable intelligent surfaces (RISs) are configured such that the reflection properties thereof are modifiable in response to a control signal such that the angle of incidence and the angle of reflection may differ from each other. Therefore, the power distribution along specific angles of reflection is generally variable upon altering the reflection properties. Consequently, RISs are believed to be valuable in a variety of future applications, such as reflection processes of signals having tailored angles of reflection to avoid signal paths being blocked by obstacles. Generally, RISs may be placed in a radio channel between a transmitter and a receiver to control the way the signals reflect off the respective surface in its propagation path. Hence, RISs allow for steering the signals along the propagation path.

However, since RISs are an outcome of only recent research developments, up to now reliable evaluation procedures for characterizing RISs are missing. Hence, the properties of different RISs are not readily comparable yet. This is of high significance since certain properties of the RIS itself have an impact on the reflection properties. For example, the reflection properties between different RISs may vary simply due to differences regarding the dimensions of the RISs.

Hence, there is a need for a method and a system based on which RISs may be reliably characterized.

SUMMARY

A summary of certain embodiments disclosed herein is set forth below. It should be understood that these aspects are presented merely to provide a brief summary of these embodiments and that these aspects are not intended to limit the scope of this disclosure. This disclosure may encompass a variety of aspects that may not be set forth below. Some aspects as explained in view of methods, others in view of devices. However, the respective aspects are to be correspondingly transferred from methods to devices and vice versa.

Embodiments of the present disclosure relate to a method for characterizing a reconfigurable intelligent surface (RIS) of a device under test (DUT). In an embodiment, an incident signal is repeatedly transmitted onto the RIS at an incident angle with respect to the RIS by using a feed antenna. Reflected signals reflected by the RIS are captured by using at least one probe antenna. The reflected signals are captured at different angles of reflection such that a three-dimensional (3D) reflection pattern is obtained. A reflected total radiated power (reflected TRP) is determined for the RIS based on the 3D reflection pattern by using a determination circuit.

Accordingly, by the above method a (single) characterization value is obtained which provides a measure for the ability of the RIS to reflect a specific amount of power along a specific region of reflection. The specific region of reflection encompasses the different angles of reflection at which the reflected signals are captured, namely the 3D reflection pattern. Thus, the RIS of the DUT may be compared to different RISs based on the determined value of the reflected TRP. Hence, a technique is established for rating the reflection properties of different RISs qualitatively as well as quantitatively.

Some embodiments of the present disclosure relate to a measurement system for characterizing a RIS of a DUT. In an embodiment, the measurement system comprises a feed antenna orientated towards the DUT, at least one probe antenna being orientated towards the DUT, and a determination circuit being coupled to the at least one probe antenna. In some embodiments, the feed antenna is configured to repeatedly transmit an incident signal onto the RIS at an incident angle with respect to the RIS. The at least one probe antenna is configured to capture reflected signals reflected by the RIS at different angles of reflection such that a 3D reflection pattern is obtained. The determination circuit is configured to determine a reflected TRP for the RIS based on the 3D reflection pattern.

The advantages readily achieved by the hereinbefore explained method are achieved by the measurement system as well. In some embodiments, the measurement system provides a robust investigation setup based on which a RIS of a DUT may be reliably characterized.

Optionally, the reflected TRP is normalized with regard to a geometrical area of the RIS by using the determination circuit. As the size of the RIS has an influence on the reflection properties, this particular influence can thus be compensated for. For example, the size of the RIS also has an influence on the dimensions of regions being centered about the RIS according to which reactive near-field or far-field conditions are present.

In some embodiments, the 3D reflection pattern has a partial or full spherical shape. Thus, the reflection properties of the RIS may be determined at equal distances around the RIS. The captured reflected signals define a specific spherical sector relative to the RIS. The size of the spherical sector depends on the resolution applied in view of the different angles of reflection. Put differently, a distance dependency of a distance between the at least one probe antenna and the RIS of the DUT potentially influencing the size of the spherical sectors may be compensated for. As a consequence, when determining the reflected TRP the distance dependency may be disregarded.

In some embodiments, the reflected power into the respective (spherical) sector is determined when the reflected total radiated power for the reconfigurable intelligent surface is determined based on the three-dimensional reflection pattern, as the three-dimensional reflection pattern defines the respective (spherical) sector.

Optionally, a first set of reflected signals is captured while the incident angle is fixed. Put differently, multiple reflected signals are captured in view of the same incident angle, at least partially at different angles of reflection. Accordingly, the reflected TRP may be determined for the specific incident angle relative to the RIS. In other words, the TRP of the (spherical) sector defined by the different angles of reflection is determined for the single specific incident angle.

In some embodiments, several different sets of reflected signals are captured while the incident angle is varied. Each set of reflected signals is associated with a dedicated incident angle. The angles of reflection used may be the same such that the TRPs determined can be compared with each other, thereby gathering information about a dependency on the angle of incidence. Consequently, the basis of the determined reflected TRP is broadened as it additionally comprises a dependency on the incident angle. Put differently, the characterization of the RIS contemplates yet another potential influence factor on the reflection properties of the RIS, namely the incident angle.

In some embodiments, for each of the sets of reflected signals being captured, the steps of transmitting an incident signal, capturing reflected signals and determining a reflected total radiated power according to the above described method are repeated. Thus, a full characterization of the RIS in view of all different incident angles being applied is achieved. Thus, the characterization of the RIS includes an additional information, namely the incident angle. In effect, the comparableness of the RIS with regard to different RISs is improved.

In some embodiments, the different incident angles are obtained by modifying an orientation of a positioner on which the DUT is located. Hence, the DUT is moved relatively to the feed antenna that maintains its position. In other words, the feed antenna may be located at a fixed position.

Alternatively or additionally, a relative orientation of the feed antenna with respect to the DUT is modified for obtaining different incident angles. Hence, the feed antenna is moved relatively to the DUT that maintains its position. In other words, the DUT may be located at a fixed position. However, it is also possible to move both the DUT and the feed antenna.

These techniques enable a reliable variation of the incident angle. Also, the techniques allow the incident angle to be precisely determined.

Optionally, the at least one probe antenna is movably mounted so as to capture the reflected signals at different angles of reflection. Accordingly, capturing the reflected signals at different angles of reflection does not require multiple probe antennas to be contemplated. Thus, the underlying measurement system may be less complex and more cost-efficient.

However, multiple probe antennas may also be used that cover the (spherical) section at which the reflected signals shall be captured. Hence, it is not necessary to provide a positioning system for the probe antenna to be moved. In some scenarios, this approach might be the favored one.

In some embodiments, a coordinate transformation is applied according to which a direction corresponding to the incident angle is used as a reference direction having 0°. Therefore, while the initial reference direction is defined by the surface normal of the RIS, due to the coordinate transformation the reference direction is moved to the direction along the incident angle. In effect, based on the coordinate transformation it can be ensured that the amount of power along the reference direction, i.e. the incident angle, can be neglected (well-known $\sin(\theta')$ problem). Hence, the determination procedure is less complex.

In some embodiments, the feed antenna and/or the at least one probe antenna are located at distances with respect to the RIS such that the feed antenna and/or the at least one probe antenna are outside a region corresponding to a reactive near-field of the RIS taking into account the dimensions of the RIS.

The difference between the near-field region and the far-field region is how the power density changes with distance. Under far-field conditions, the directional characteristics of the RIS naturally decouple from the separation distance. Consequently, in the far-field region, the power density about the focal point shows a well-known spherical dissipation of the signal power with the distance. While certainly both, near-field as well as far-field applications may be considered in view of the RIS, only far-field conditions enable the signal strength to be enhanced for users located at targeted angles (and not at targeted locations as in case of near-field conditions) with respect to the RIS.

Therefore, if the distances of the feed antenna and/or the at least one probe antenna with respect to the RIS are chosen appropriately, far-field properties may be assumed to be valid. Accordingly, the near-field effects are not required to be considered anymore. Thus, the complexity of the characterization of the RIS is reduced while a desired power density dissipation is achieved.

In some embodiments, an incident TRP transmitted by the feed antenna onto the RIS is determined using the determination circuit. In this regard, the determination circuit may be coupled to the feed antenna. Accordingly, the reflected TRP may be evaluated in view of the transmitted TRP, e.g. the power outputted by the feed antenna. Therefore, a power reflection coefficient of the RIS may be determined. Thus, the RIS may be characterized regarding an additional aspect.

In some embodiments, the incident TRP may be measured to countercheck any setting with regard to the output power of the feed antenna and/or directivity issues with the feed antenna.

Optionally, a metric is determined based on the reflected TRP for the RIS and a reflected TRP for a reference object. In some embodiments, the metric may comprise a ratio of the reflected total radiated power (TRP) value of the RIS compared to the reflected total radiated power (TRP) value of the reference object. Also, the metric may consider the dimensions of the reference object and the RIS, for example a ratio of the dimensions of the reference object compared to the dimensions of the RIS. Since specific ratios in view of the reflections from the RIS and the reference object are considered, the metric may be independent from the power of the incident beam (at least of the power of the incident signal is kept constant). Therefore, the metric may be used to compare different RISs omitting an influence of the power of the incident beam.

In some embodiments, the metric is determined by utilizing the determination circuit.

In other words, the reflected total radiated power (TRP) is normalized with regard to a reflected total radiated power (TRP) of a perfect reflector by using the determination circuit. In this regard, the perfect reflector represents a reference based on which the reflected TRP is assessed. This reference may be applied as well when different RISs are evaluated. Hence, the comparableness of the characterization of the RIS of the DUT is more reliable.

Also, based on the perfect reflector an influence of the signal strength of the incident signal can be ruled out, at least if the perfect reflector and the RIS are applied with same signal strengths of the respective incident signals.

In some embodiments, the perfect reflector has a reflection coefficient of 1 or a reflection coefficient which shows only a negligible difference from 1. Therefore, a well-defined reference value of the perfect reflector can be ensured.

In some embodiments, the reference object may comprise the perfect reflector. In some embodiments, the reference object may comprise a reflection coefficient having a predetermined value. Also, the reference object may comprise an aluminum plate.

Optionally, the RIS is coupled to a power supply configured to vary a supply signal provided to the RIS such that reflection properties of the RIS are varied. In some embodiments, the reflection properties of the RIS may be varied upon capturing several different sets of reflected signals while the incident angle is kept constant. Each set of reflected signals is associated with a dedicated set of reflection properties of the RIS. Thus, the characterization of the RIS may be even more sophisticated also including (defined and controlled) variations of the reflection properties of the RIS itself. Straightforwardly, this characterization allows the RIS to be tailored for certain applications with even improved precision.

In some embodiments, the measurement system comprises an anechoic chamber, encompassing the DUT, a positioner, on which the DUT is placed, and/or at least one RF amplifier that is coupled to the feed antenna and/or the at least one probe antenna. By the anechoic chamber a well-defined measurement environment is established. Accordingly, environmental noise may be reduced. By the positioner a well-defined orientation and location of the DUT is guaranteed. The at least one RF amplifier may be applied to amplify the respective signal strength. Accordingly, the signal-to-noise ratio (SNR) of the signal of the feed antenna and/or the at least one probe antenna may be improved.

In some embodiments, an analyzer is connected with the at least one probe antenna. Preferably, the analyzer is at least indirectly coupled to the at least one probe antenna. In some embodiments, the analyzer is a vector network analyzer, a signal analyzer, or a spectrum analyzer.

Alternatively or additionally, a signal generator is connected with the at least one probe antenna. Preferably, the signal generator is at least indirectly coupled to the feed antenna. In some embodiments, the signal generator is a vector signal generator.

Based on the analyzer and the signal generator the feed signals or captured signals may be prepared or evaluated (in general: processed) with improved precision, for example utilizing improved signal-to-noise ratios.

Optionally, the at least one probe antenna is movably mounted so as to reach different reception positions associated with the different angles of reflection. Thus, only a single probe antenna is required. The underlying measurement system may be less complex and more cost-efficient.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
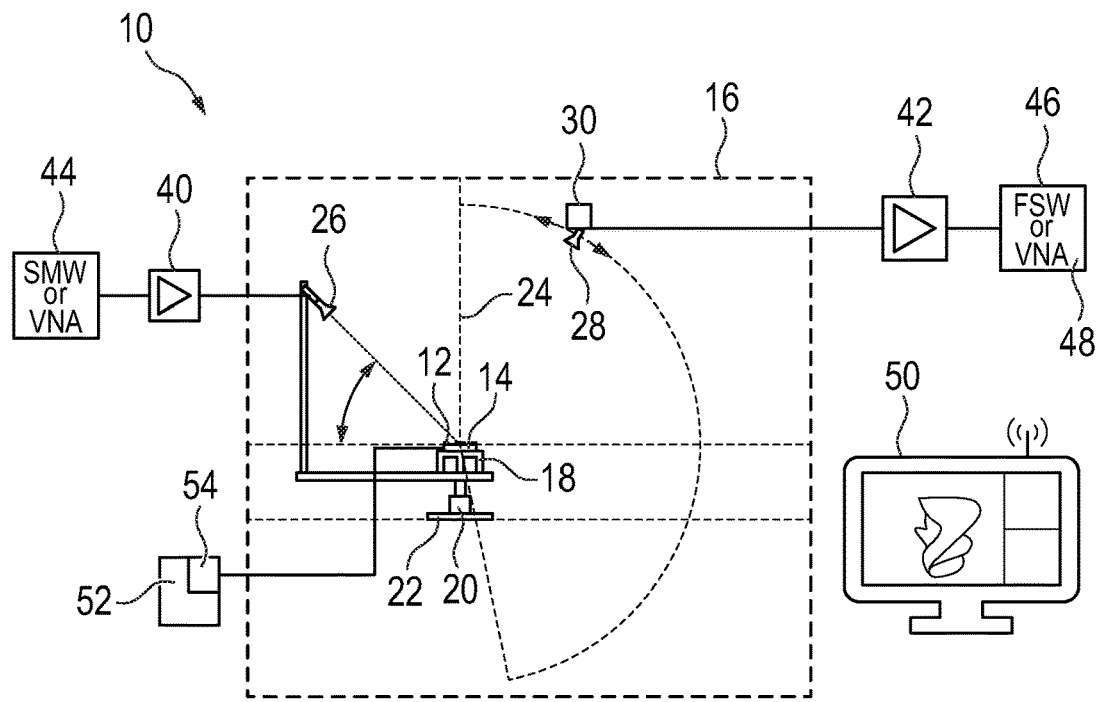
FIG. 1 is a schematic drawing of a measurement system for characterizing a RIS of a DUT according to an embodiment of the present disclosure.

FIG. 1 is a schematic drawing of a measurement system 10 for characterizing a RIS 12 of a DUT 14 according to an embodiment of the disclosure. In some embodiments, the RIS 12 comprises PIN-diodes (positive intrinsic negative diodes) and/or Varactor-diodes and/or Metamaterials. These types of materials are well-suited to establish reliable RISs 12.

According to this embodiment, the measurement system 10 comprises an anechoic chamber 16. Inside the anechoic chamber 16, an optional positioner 18 is provided on which the DUT 14 is located.

According to an embodiment of the present embodiment, the positioner 18 comprises a height adjustment device 20 and a turntable 22. These devices may include, for example, motorized linear and/or rotary stages for affecting linear and/or rotational position adjustment to an object, such as the DUT 14, supported thereby. Consequently, based on the positioner 18, the DUT 14 having the RIS 12 may be orientated along different directions, for example in a spherical manner. As a reference, a surface normal 24 of the RIS 12 may be used to define an orientation of the RIS 12.

Inside the anechoic chamber 16, a feed antenna 26 is provided and, according to this embodiment, a single probe antenna 28. According to different examples, multiple probe antennas 28 may be provided instead of the single probe antenna 28, which are arranged in a certain pattern or grid as will be discussed later in more detail.

The feed antenna 26 is configured to repeatedly transmit radio frequency (RF) signals onto the RIS 12 of the DUT 14. The RF signal may comprise a frequency of 1 MHz or more, and in some embodiments of 1 GHz or more. In some embodiments, the respective frequency depends on the DUT 14, for example its typical operation scenario. The probe antenna 28 is configured to detect RF signals reflected by the RIS 12, for example in the specific frequency range.

According to this embodiment, the feed antenna 26 is mechanically coupled with the positioner 18 and orientated thereto. Therefore, the feed antenna 26 has a fixed spatial relationship with the positioner 18. However, as the positioner 18 can be re-orientated, e.g. based on the height adjustment device 20 and the turntable 22, a relative orientation between the surface normal 24 of the RIS 12 and the feed antenna 26 is variable. Therefore, the incident signals are transmitted by the feed antenna 26 onto the RIS 12 according to a specific incident angle.

According to this embodiment, the probe antenna 28 is mechanically fixed with a movable mounting device 30, e.g. a gantry arm. Consequently, the probe antenna 28 may be located and orientated according to different reception positions having different relative spatial relationships with the DUT 12. In some embodiments, according to this example, the gantry arm is configured so as to relocate the probe antenna 28 according to different reception positions coinciding with the surface of a sphere centered about the RIS 12.

As a result, the probe antenna 28 is configured to capture reflected signals reflected by the RIS 12 at different angles of reflection such that a 3D reflection pattern is obtained.

The 3D reflection pattern comprises positions along a section of a sphere, e.g. positions along a spherical surface.

Alternatively or additionally, the mounting device 30 may also comprise an elevation arm configured to reposition the probe antenna 28. The mounting device 30 provides compact and cost-efficient mechanisms based on which the probe antenna 28 may be moved relative to the RIS 12.

Alternatively to the movable probe antenna 28, many separately formed probe antennas may be used, e.g., an antenna array, wherein the several probe antennas are located at the positions of the 3D reflection pattern. Hence, in this embodiment, it would not be necessary to relocate the probe antenna. Depending on the test site, one of these approaches may be beneficial over the other one.

The feed antenna 26 and/or the probe antenna 28 are located at distances with respect to the RIS 12 such that the feed antenna 26 and/or the probe antenna 28 are outside a region corresponding to a reactive near-field of the RIS 12 taking into account the dimensions of the RIS 12. Put differently, in view of the RIS 12 and in view of the RIS's dimensions, the feed antenna 26 and the probe antenna 28 are located such that far-field conditions are met. Therefore, the power density about the focal point, namely the RIS 12 shows a well-known spherical dissipation of the signal power with the distance.

Figure 2:
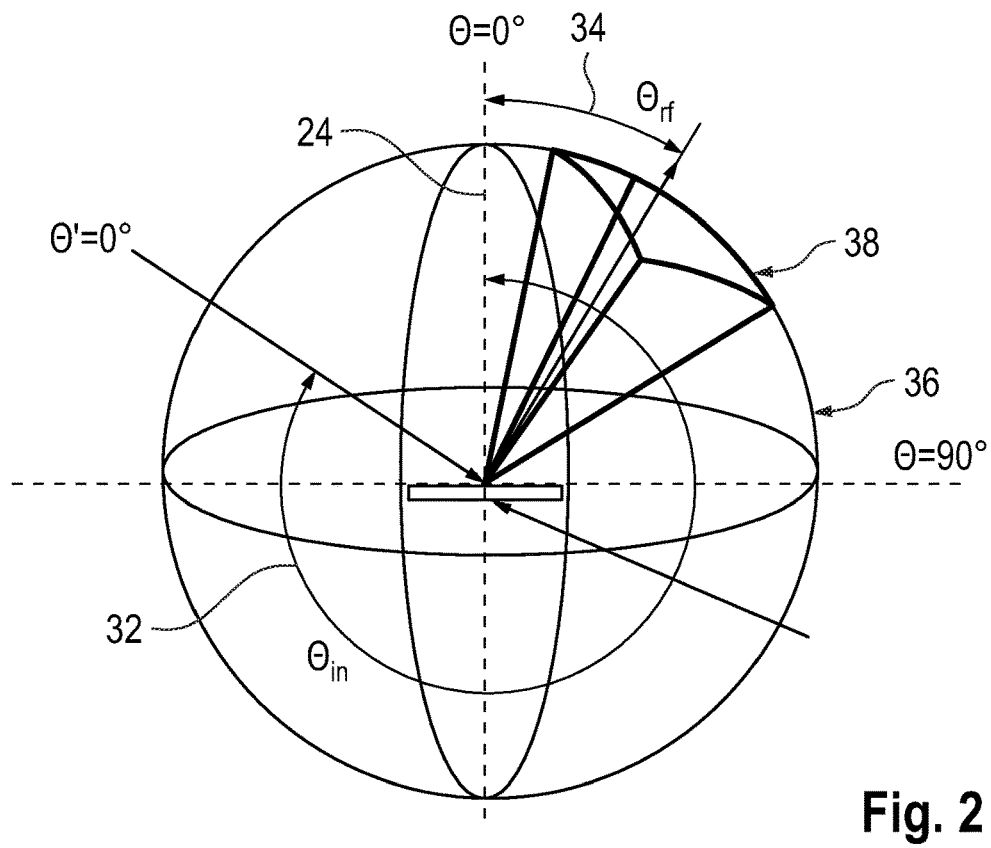
FIG. 2 is a schematic drawing of the orientations of the incident and reflected signals with respect to the RIS.

As to the spherical dissipation, a spherical coordinate system $(\Theta, \varphi)$ is applied when describing the orientations of the underlying reflection procedure. In this regard, FIG. 2 is a schematic representation of the orientations of the incident signal and the reflected signal with respect to the RIS 12.

The angle $\theta=0$ corresponds to an initial coordinate system where the direction along the surface normal 24 of the RIS 12 is used as a reference. The angle of $\theta'=0$ corresponds to a different, desired coordinate system where the direction along the incident angle 32 is used as a reference. The initial coordinate system can be transformed into the desired coordinate system. Within the initial coordinate system, the incident angle 32 along which the incident signal is transmitted by the feed antenna 26 onto the RIS 12 is denoted $\Theta_{in}$. The transformation between the initial coordinate system and the desired coordinate system is defined by:

$$\theta' = \theta - \theta_{in}.$$

The angle of reflection 34 along which signals reflected by the RIS 12 are captured by the probe antenna 28 is denoted $\Theta_{rf}$ within the initial coordinate system. This value can be correspondingly transformed into the desired coordinate system.

Since far-field conditions are met, the probe antenna 28 is moved by the mounting device 30 along a surface of a sphere 36. However, depending on the angle of reflection 34, $\Theta_{rf}$ the power density shows variations. Therefore, the probe antenna 28 is movable by the mounting device 30 to different reception positions coinciding with the surface of the sphere 36 to capture multiple incident signals at different angles of reflection 34 so that a 3D reflection pattern is obtained. Accordingly, each location at which the reflected signal is captured corresponds to a region of interest 38 having the shape of spherical sector.

As discussed above, a (spherical) sector is checked by the 3D reflection grid along which the probe antenna 28 is moved, wherein the (spherical) sector corresponds to the region of interest 38.

The dimensions of the region of interest 38 depend on the number of different locations along which reflected signals are captured and/or their distances among each other. Put differently, the dimensions of the region of interest 38 depend on the resolution applied to cover the sphere 36 about the RIS 12 and/or the spatial resolution of measurement points. Therefore, the size of the region of interest 38 on the surface of the sphere 36 along which the probe antenna 28 is moved can be denoted by $\xi_\theta$ and $\xi_\varphi$. Using the denotation of the underlying coordinate system, the dimensions of the region of interest 38 on the spherical surface may be denoted by:

$$\theta'_l = \theta_{rf} - \xi_\theta - \theta_{in}$$
$$\theta'_u = \theta_{rf} + \xi_\theta - \theta_{in}$$
$$\varphi_l = \varphi_{rf} - \xi_\varphi$$
$$\varphi_u = \varphi_{rf} + \xi_\varphi$$

Here u and l describe opposite borders of the region of interest 38 on the surface of the sphere 36.

Referring again to FIG. 1, according to the present example, the measurement system 10 also comprises RF amplifiers 40, 42. An output port of the first RF amplifier 40 is coupled to the feed antenna 26 and an input port of the second RF amplifier 42 is coupled to the probe antenna 28. The RF amplifiers 40, 42 are configured to amplify signals being processed. Accordingly, the signal strength may be improved such that enhanced signal-to-noise ratios are achieved.

Moreover, an input port of the first RF amplifier 40 is coupled to a signal generator 44, which, according to this embodiment, is a vector signal generator. Based on the signal generator 44 tailored signals may be generated which can be processed by the first RF amplifier 40 and, subsequently, provided to the feed antenna 26 for transmitting an incident signal onto the RIS 12.

In the embodiment shown, an output port of the second RF amplifier 42 is coupled to an analyzer 46, such as for example, a vector signal analyzer. Signals being reflected by the RIS 12 are captured by the probe antenna 28 provided to the second RF amplifier 40 and, subsequently, fed into the analyzer 46. The analyzer 46 includes circuitry configured to analyze the signals received so as to extract information in order to characterize the RIS 12 of the DUT 14.

In some embodiments, the measurement system 10 also comprises at least one determination circuit 48 which, according to the example shown in FIG. 1, is part of the analyzer 46. The determination circuit 48 is configured to determine a reflected TRP for the RIS 12 based on the 3D reflection pattern.

In the embodiment shown in FIG. 1, the measurement system 10 may also comprise a user interface 50. In some embodiments, the user interface 50 may be connected to the determination circuit 48. The user interface 50 is configured to output visually based results of determination procedures carried out by the determination circuit 48, for example by a display. For example, the reflected TRP for the RIS 12 may be outputted. In addition, the user interface 50 is also configured to receive user inputs according to the present example. Based on the user inputs, the signal generated by the signal generator 44 and/or the position(s) of the DUT 14, the feed antenna 26 and/or the probe antenna 28 may be set.

In some embodiments, at least one of, for example all of, the positioner 18, the signal generator, 44, the first RF amplifier 40, the second RF amplifier 42, the analyzer 46, and the determination circuit 48 are remotely controllable based on commands received from the user interface 50. Therefore, based on the user inputs received via the user interface 50 the investigation procedure carried out by the measurement system 10 may be tailored. In addition, the time-efficiency of the measurement procedures may be enhanced since manually entered control commands can be avoided. The connections between the user interface 50 and the remotely controllable components may be wireless, wired, or both.

In some example embodiments, the measurement system 10 also comprises a control device 52, optionally being remotely controllable, being coupled to the RIS 12 of the DUT 14. The control device 52 may include circuitry configured to vary a supply signal provided to the RIS 12, for example provided by a power supply 54, such that reflection properties of the RIS 12 are (actively) varied, e.g. in a defined manner. Therefore, the RIS 12 may also be characterized when having different reflection properties. In this regard, the control device 52 may be controllable via the user interface 50.

Figure 3:
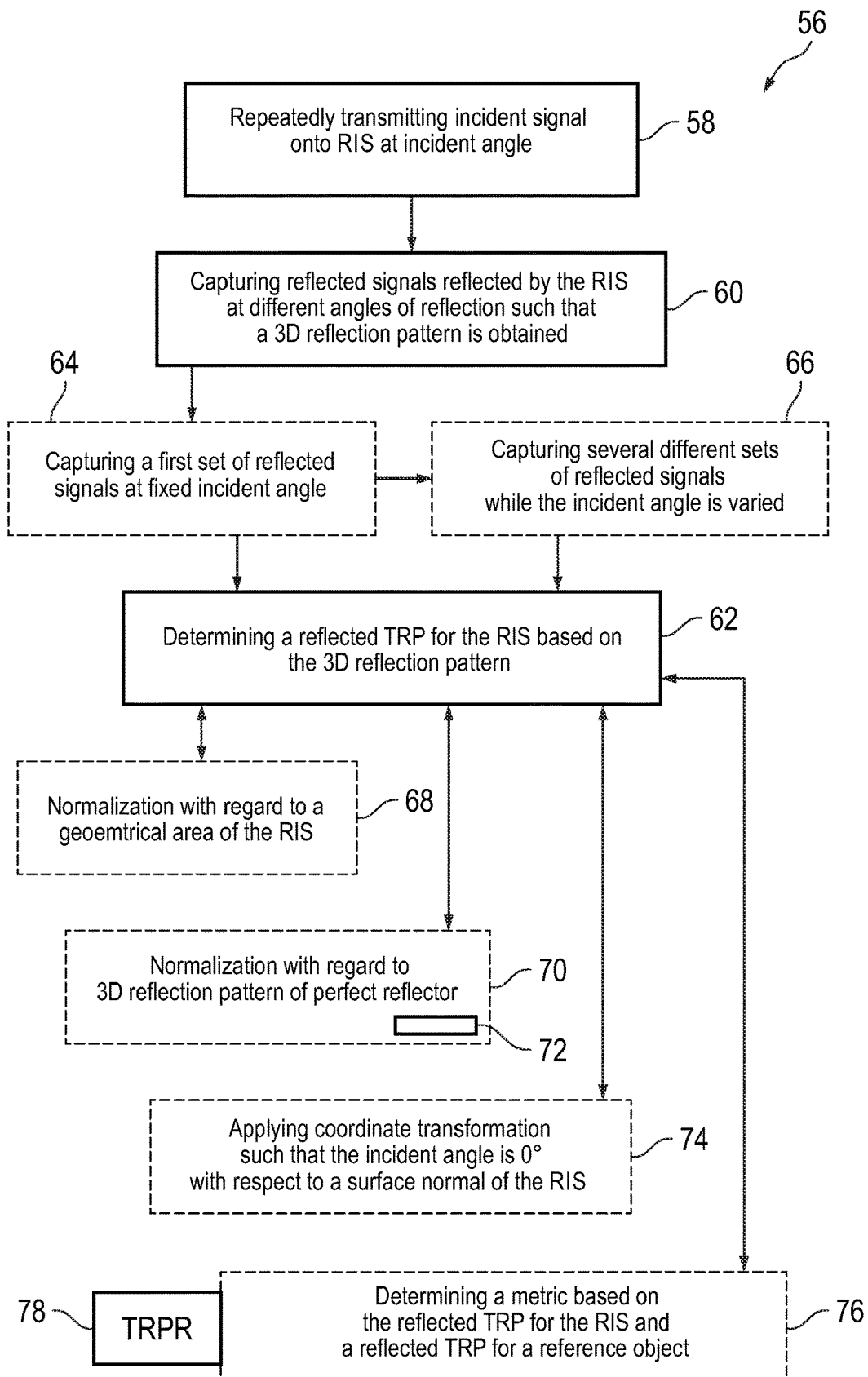
FIG. 3 is a schematic drawing of a method for characterizing a RIS of a DUT according to an embodiment of the present disclosure.

FIG. 3 is a schematic drawing of a representative method 56 for characterizing the RIS 12 of the DUT 14 according to an embodiment. Optional steps are shown in dashed lines.

In step 58, an incident signal is repeatedly transmitted onto the RIS 12 at an incident angle 32 with respect to the RIS 12, for example the surface normal 24, by using the feed antenna 26. Here, the feed antenna 26 is orientated towards the RIS 12.

In step 60, reflected signals reflected by the RIS 12 are captured by using the single probe antenna 28. The reflected signals are captured at different angles of reflection 34 such that a 3D reflection pattern is obtained. In some embodiments, the 3D reflection pattern is obtained as the probe antenna 28 is moved to different reception positions by the mounting device 30 along the region of interest 38. In some embodiments, these reception positions coincide with the surface of the sphere 36. Hence, the region of interest 38 corresponds to the (spherical) section as discussed before.

In step 62, the reflected TRP for the RIS 12 is determined based on the 3D reflection pattern by using the determination circuit 48. In some embodiments, the TRP for the RIS 12 is determined by the following equation:

$$\int_{\theta'=\theta'_1}^{\theta'_u} \int_{\varphi=\varphi_1}^{\varphi_u} EiRP_{RIS}(\theta', \varphi)\sin(\theta')d\varphi\, d\theta'$$

The Equivalent isotropic Radiated Power (EiRP) is measured for the RIS 12 at each position in the 3D reflection pattern, namely in the region of interest 38. By integrating the EiRPs measured over the respective spherical section ("spherical integration"), corresponding to the region of interest 38, the reflected TRP is gathered.

Based on the reflected TRP, the RIS 12 is characterized such that its properties may be compared to the properties of different RISs 12. Optionally, the reflected TRP may be outputted via the user interface 50.

In step 64, following step 60, a first set of reflected signals is captured while the incident angle 32 is fixed. The first set of reflected signals is captured at least partially at different angles of reflection 34. Therefore, a 3D reflection pattern is obtained for a specific incident angle 32 such that influences of varying incident angles 32 can be ruled out. For keeping the incident angle 32 fixed, the orientation and location of the RIS 12 relative to the feed antenna 26 can be kept constant by the positioner 18, for example using the height adjustment device 20 and the turntable 22.

According to optional step 66, several different sets of reflected signals are captured while the incident angle 32 is varied. Each set of reflected signals is associated with a dedicated incident angle 32. In this regard, for each set of reflected signals the probe antenna 28 may be relocated according to different reception positions and while the incident angle 32 is kept constant for the respective set. After having completed a respective set of reflection signals, the incident angle 32 is varied using the positioner 18, and, subsequently, another set of reflection signals is captured.

As a consequence, a 3D reflection pattern is obtained for each dedicated incident angle 32. Also, for each set of reflection signals, the corresponding reflected TRP is determined using the determination circuit 48, as discussed above. Thus, the RIS 12 is characterized for a variety of different incident angles 32.

Optionally, different sets of reflected signals may also be captured using the probe antenna 28 while the reflection properties of the RIS 12 are varied between subsequent sets by utilizing the control device 52. In effect, different sets of reflection signals may then depend on the incident angle 32 and/or on tailored reflection properties of the RIS 12 controlled via the control device 52.

The method 56 may also comprise single or multiple additional optional steps regarding the characterization of the RIS 12. Steps 68, 70, 74, and 76 may also be part of step 64.

In optional step 68, the 3D reflection pattern is normalized with regard to a geometrical area of the RIS 12 by using the determination circuit 48. The dimensions of the RIS 12 influence the reflection properties, such as the signal strength of the reflect signal. Accordingly, by considering the dimensions of the RIS 12, this effect can be ruled out when characterizing the RIS 12.

In optional step 70, the 3D reflection pattern is normalized with regard to a 3D reflection pattern of a perfect reflector 72 by using the determination circuit 48. In some embodiments, the perfect reflector 72 has a predetermined reflection coefficient, for example of 1 or close to 1 (such close that the difference may be neglected). Accordingly, a reference is provided based on which different RISs 12 may be compared as the signal strength of the incident signal can be compensated for as to the normalization procedure using the perfect reflector 72. Consequently, the characterization of the RIS 12 may be independent from the signal strength of the incident beam based on this normalization routine.

In some embodiments, the perfect reflector 72 may comprise a plate made of a metal, such as Aluminum.

For guaranteeing a specific reflection coefficient, the reflection surface of the perfect reflector 72 may be polished, for example fine polished or ultra-fine polished such that a roughness lower than a predetermined roughness threshold value is achieved. Since the roughness has an influence on the reflection coefficient of a reflection surface, the reflection coefficient may thus be tailored to become 1 or to have only a negligible difference as compared to a reflection coefficient of 1.

In optional step 74, a coordinate transformation is applied according to which the direction corresponding to the incident angle 32 is used as a reference direction having 0°. This coordinate transformation is explained hereinbefore. In effect, based on the coordinate transform it can be ensured that the amount of power in θ'=0 can be neglected (well-known sin(θ') problem).

In optional step 76, a metric 78 is determined based on the reflected TRP for the RIS 12 and a reflected TRP for a reference object. In some embodiments, the reference object is a perfect reflector 72, such as a fine-polished plate made of Aluminum, which was mentioned before. In some embodiments, the metric 78 may be determined using the determination circuit 48.

In some embodiments, the metric 78 may comprise different ratios such that specific influences, e.g. the signal strength of the incident beam and relative geometrical sizes are ruled out. In some embodiments the metric 78 can be considered a reflected TRP ratio (TRPR) and described by:

$$TRPR = \frac{A_{REF}}{A_{RIS}} \frac{\int_{\theta'=\theta_l'}^{\theta_u'} \int_{\varphi=\varphi_l}^{\varphi_u} EiRP_{RIS}(\theta', \varphi)\sin(\theta')d\varphi d\theta'}{\int_{\theta'=0}^{\pi} \int_{\varphi=0}^{2\pi} EiRP_{REF}(\theta', \varphi)\sin(\theta')d\varphi d\theta'}$$

As discussed before, $EiRP_{RIS}$ denotes the equivalent isotropic radiated power measured for the RIS 12 of the DUT 14 at the respective positions where the reflected signals were captured. In contrast, $EiRP_{REF}$ denotes the equivalent isotropic radiated power measured for the reference object at the respective positions where the reflected signals were captured. The position may be the same for both the DUT 14 and the reference object, but it is not necessary as long as the same section is covered, namely the same region of interest 38.

The determined reflected TRP (see step 62) is obtained from the EiRP values being integrated over (at least parts of) the sphere 36. Thus, the metric 78 may be determined based on the determined TRP values of the RIS 12 and the reference object, such as the perfect reflector 72. Optionally, the dimensions of the measurement system 10 can be considered in this regard. In some embodiments, the size of the sphere 36 can be considered.

Within the metric 78, $A_{REF}$ denotes a geometrical area of the reference object and $A_{RIS}$ denotes a geometrical area of the RIS 12. The normalization to the geometrical areas is applied as the geometrical area is proportional to the respective reflected TRP values.

Based on the metric 78, an influence due to the signal strength of the incident signal can be ruled out of the RIS 12 and the reference object are exposed with same signal strengths of the respective incident signals. Moreover, the geometrical area related effects are ruled out as well. Also, a specific reference direction is chosen in view of the direction along the incident angle. Therefore, based on the metric 78 the RIS 12 may be reliably characterized. Hence, the RIS 12 may be compared to different RISs 12 in view of the respective reflection properties based on the metric 78.

Certain embodiments disclosed herein include components that utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In some embodiments, one or more of the components referenced above include circuitry programmed to carry out one or more steps of any of the methods disclosed herein. In some embodiments, one or more computer-readable media associated with or accessible by such circuitry contains computer readable instructions. These instructions may include, for example, applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably).

These program instructions, when executed by such associated circuitry, cause the component or circuitry to perform one or more steps of any of the methods disclosed herein. In that regard, the circuitry and/or memory storing the program instructions forms a special purpose machine or apparatus specifically configured to carry out the some of, or all of, the methodologies and technologies described in each block of any of the block diagrams and/or flowchart illustrations, or set forth in the claimed subject matter.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein. All such combinations or sub-combinations of features are within the scope of the present disclosure.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C." for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The drawings in the FIGURES are not to scale. Similar elements are generally denoted by similar references in the FIGURES. For the purposes of this disclosure, the same or similar elements may bear the same references. Furthermore, the presence of reference numbers or letters in the drawings cannot be considered limiting, even when such numbers or letters are indicated in the claims.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A method for characterizing a reconfigurable intelligent surface of a device under test, the method comprising at least the steps of:
    repeatedly transmitting an incident signal onto the reconfigurable intelligent surface at an incident angle with respect to the reconfigurable intelligent surface by using a feed antenna,
    capturing reflected signals reflected by the reconfigurable intelligent surface by using at least one probe antenna, wherein the reflected signals are captured at different angles of reflection such that a three-dimensional reflection pattern is obtained, and
    determining, by using a determination circuit, a reflected total radiated power for the reconfigurable intelligent surface based on the three-dimensional reflection pattern.

2. The method according to claim 1, wherein the reflected total radiated power is normalized with regard to a geometrical area of the reconfigurable intelligent surface by using the determination circuit.

3. The method according to claim 1, wherein the three-dimensional reflection pattern has a partial or full spherical shape.

4. The method according to claim 1, wherein a first set of reflected signals is captured while the incident angle is fixed.

5. The method according to claim 1, wherein several different sets of reflected signals are captured while the incident angle is varied, wherein each set of reflected signals is associated with a dedicated incident angle.

6. The method according to claim 5, wherein, for each set, the steps of transmitting an incident signal, capturing reflected signals and determining a total radiated power are repeated.

7. The method of claim 5, wherein the different incident angles are obtained by modifying an orientation of a positioner on which the device under test is located and/or by modifying a relative orientation of the feed antenna with respect to the device under test.

8. The method according to claim 1, wherein the at least one probe antenna is movably mounted so as to capture the reflected signals at different angles of reflection.

9. The method according to claim 1, wherein a coordinate transformation is applied according to which a direction corresponding to the incident angle is used as a reference direction having 0°.

10. The method according to claim 1, wherein the feed antenna and/or the at least one probe antenna are located at distances with respect to the reconfigurable intelligent surface such that the feed antenna and/or the at least one probe antenna are outside a region corresponding to a reactive near-field of the reconfigurable intelligent surface taking into account the dimensions of the reconfigurable intelligent surface.

11. The method according to claim 1, wherein a metric is determined based on the reflected total radiated power for the reconfigurable intelligent surface and a reflected total radiated power for a reference object.

12. A measurement system for characterizing a reconfigurable intelligent surface of a device under test, the measurement system comprising:
    a feed antenna orientated towards the device under test,
    at least one probe antenna being orientated towards the device under test, and
    a determination circuit being coupled to the at least one probe antenna,
    wherein the feed antenna is configured to repeatedly transmit an incident signal onto the reconfigurable intelligent surface at an incident angle with respect to the reconfigurable intelligent surface,
    wherein the at least one probe antenna is configured to capture reflected signals reflected by the reconfigurable intelligent surface at different angles of reflection such that a three-dimensional reflection pattern is obtained, and
    wherein the determination circuit is configured to determine a a reflected total radiated power for the reconfigurable intelligent surface based on the three-dimensional reflection pattern.

13. The measurement system according to claim 12, wherein the reconfigurable intelligent surface is coupled to a power supply configured to vary a supply signal provided to the reconfigurable intelligent surface such that reflection properties of the reconfigurable intelligent surface are varied.

14. The measurement system according to claim 12, wherein the measurement system comprises an anechoic chamber, encompassing the device under test, a positioner, on which the device under test is placed, and/or at least one radio frequency amplifier that is coupled to the feed antenna and/or the at least one probe antenna.

15. The measurement system according to claim 12, wherein an analyzer is connected with the at least one probe antenna and/or wherein a signal generator is connected with the probe antenna.

16. The measurement system according to claim 15, wherein the analyzer is one of a vector network analyzer, signal analyzer or a spectrum analyzer.

17. The measurement system according to claim 15, wherein the signal generator is a vector signal generator.

18. The measurement system according to claim 12, wherein the at least one repositionable probe antenna is movably mounted so as to reach different reception positions associated with the different angles of reflection.

19. The measurement system according to claim 12, wherein the feed antenna and/or the at least one probe antenna are/is located at distances with respect to the reconfigurable intelligent surface such that the feed antenna and/or the at least one probe antenna are outside a region corresponding to a reactive near-field of the reconfigurable intelligent surface taking into account the dimensions of the reconfigurable intelligent surface.

20. The measurement system according to claim 12, wherein the determination circuit is configured to determine a metric based on the reflected total radiated power for the reconfigurable intelligent surface and a reflected total radiated power for a reference object.

* * * * *